(12) United States Patent
Yu Tseng et al.

(10) Patent No.: US 12,530,516 B2
(45) Date of Patent: Jan. 20, 2026

(54) METHOD AND NON-TRANSITORY COMPUTER-READABLE MEDIUM FOR ARRANGING COMPONENTS WITHIN A SEMICONDUCTOR DEVICE

(71) Applicant: TAIWAN SEMICONDUCTOR MANUFACTURING COMPANY LTD., Hsinchu (TW)

(72) Inventors: Hsien Yu Tseng, Miaoli County (TW); Wei-Ming Chen, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 780 days.

(21) Appl. No.: 17/817,257

(22) Filed: Aug. 3, 2022

(65) Prior Publication Data
US 2024/0046020 A1    Feb. 8, 2024

(51) Int. Cl.
*G06F 30/392* (2020.01)
*G06F 30/394* (2020.01)

(52) U.S. Cl.
CPC .......... *G06F 30/392* (2020.01); *G06F 30/394* (2020.01)

(58) Field of Classification Search
CPC ...... G06F 30/39; G06F 30/392; G06F 30/394; G06F 30/398; G06F 30/20; G06F 30/347; H10D 89/10
USPC ........................................................ 716/119
See application file for complete search history.

(56) References Cited

U.S. PATENT DOCUMENTS

2008/0239780 A1* 10/2008 Sasaki .................... G11C 5/025
                                                                    365/51

* cited by examiner

*Primary Examiner* — Paul Dinh
(74) *Attorney, Agent, or Firm* — WPAT LAW; Anthony King (57) ABSTRACT

The present disclosure provides a method and a non-transitory computer-readable medium for arranging components within a semiconductor device. The method includes providing a plurality of electrical components in a pre-layout, generating a first layout by routing the plurality of electrical components, obtaining a first resistance between a power terminal of the first layout and a first terminal of a first electrical component in the first layout, comparing the first resistance and a first threshold, adjusting routing of the first layout such that the first resistance is less than the first threshold, and generating a tape out file for the semiconductor device according to the first layout.

20 Claims, 8 Drawing Sheets

METHOD AND NON-TRANSITORY COMPUTER-READABLE MEDIUM FOR ARRANGING COMPONENTS WITHIN A SEMICONDUCTOR DEVICE

BACKGROUND

The layout of integrated circuitry (IC) is currently implemented using automatic placement and routing (APR) tools. The performance of the IC can be verified before the layout is implemented. However, after the layout is implemented, an extra voltage drop (e.g. IR drop, indicating the voltage drop due to the current (I) and the resistance (R)) caused by parasitic resistance/capacitance in middle-end of line (MEOL) or back-end of line (BEOL) may diminish the performance of the IC.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed. In current practice, when the performance is determined to be unacceptable after the layout is implemented, the entire layout would be adjusted again. That is, the size and placement of devices in the IC, and the routing for connecting such devices may need to be adjusted. Therefore, the time required for reaching the target performance would increase. In addition, to avoid the IR drop, the area of the IC may be enlarged so as to boost the performance of the IC. Therefore, an improved method of reducing the performance gap between pre-layout and post-layout is necessary.

Figure 1:
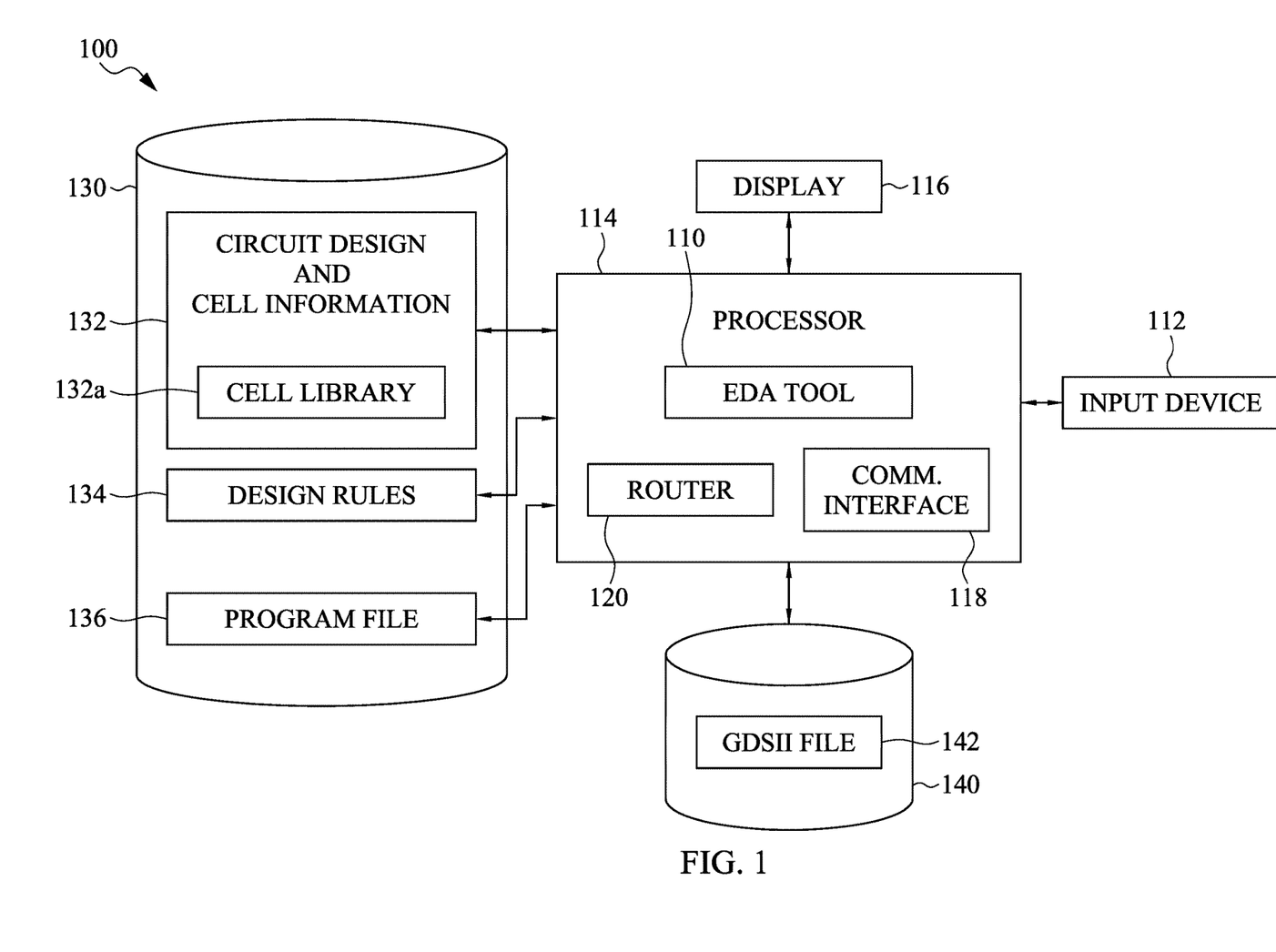
FIG. 1 is a diagram illustrating an electronic design automation system, in accordance with some embodiments of the present disclosure.

FIG. 1 is a diagram illustrating an electronic design automation system 100 in accordance with some embodiments. As shown in FIG. 1, system 100 includes an electronic design automation ("EDA") tool 110 having a place and route tool including a chip assembly router 120.

The EDA tool 110 is a special purpose computer configured to retrieve stored program instructions 136 from a computer readable storage medium 130 and 140 and execute the instructions on a general purpose processor 114. Processor 114 may be any central processing unit ("CPU"), microprocessor, micro-controller, or computational device or circuit for executing instructions. The non-transitory computer readable storage medium 130 and 140 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130 and 140 may store data input by a user such as a circuit design and cell information 132, which may include a cell library 132a, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 118 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels. The communications interface 118 may be a wired link and/or a wireless link coupled to a local area network (LAN) or a wide area network (WAN).

Router 120 is capable of receiving an identification of a plurality of cells to be included in a circuit layout, including a list 132 of pairs of cells. The plurality of cells can be connected to each other. In some embodiments, the list 132 can be selected from the cell library 132a. Design rules 134 may be used for a variety of processing technologies. In some embodiments, the design rules 134 configure the router 120 to locate connecting lines and vias on a manufacturing grid. Other embodiments may allow the router to include off-grid connecting lines and/or vias in the layout.

Figure 2:
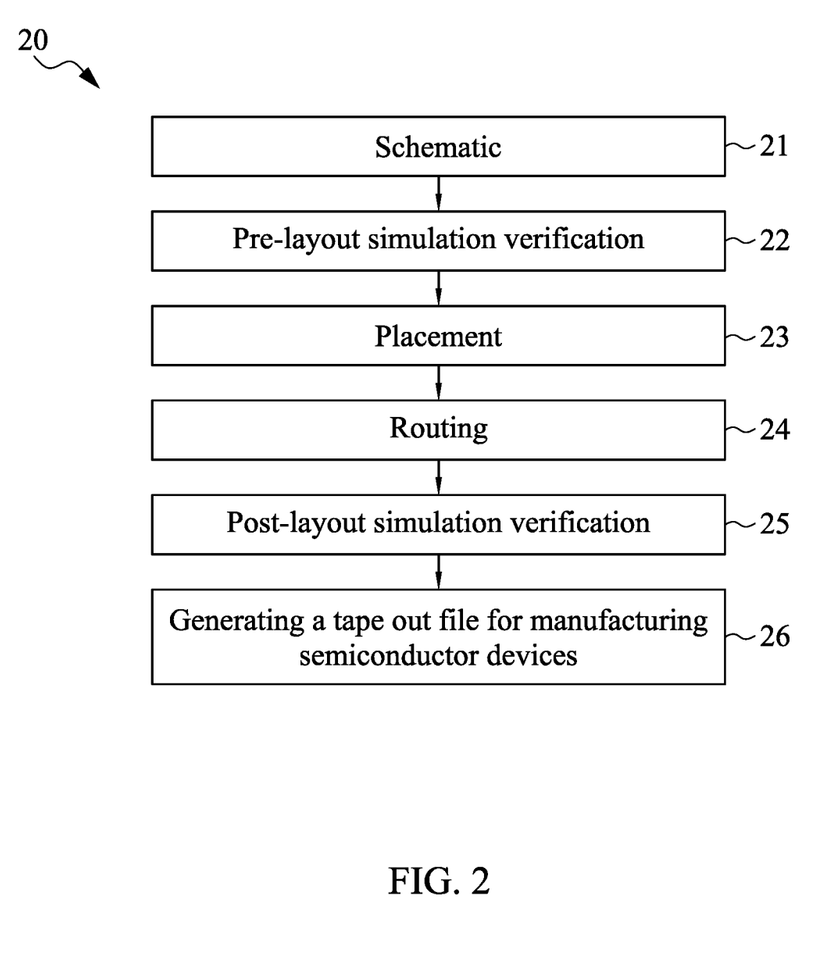
FIG. 2 is a flowchart showing a method for generating an IC layout, in accordance with some embodiments of the present disclosure.

FIG. 2 is a flowchart 20 showing a method for generating an integrated circuit (IC) layout, in accordance with some embodiments of the present disclosure. In some embodiments, this method may include an automatic placement and routing (APR) process. In some embodiments, the APR process of the present disclosure may be applied to any suitable integrated circuit layout.

The method for generating an IC layout shown in FIG. 2 may begin in operation 21, generating a schematic of the IC based on a set of functionality requirements.

In operation 22, a pre-layout simulation verification can be performed. In some embodiments, the operation 22 may verify the performance of the schematic of the IC based on the pre-layout simulation of the IC to be designed. For example, the performance of the IC can be determined by inputting different signals to the schematic (or circuitry) thereof. The performance of the IC can be determined by operating frequency, power, power loss, etc.

For example, the pre-layout simulation may be generated according to design data corresponding to an IC layout stored in a data storage device. In some embodiments, the pre-layout simulation may be executed on the design by, e.g., an EDA tool, to determine whether the design meets a predetermined specification. If the design does not meet the predetermined specification, the semiconductor device is redesigned. In some embodiments, a SPICE simulation is performed on the SPICE netlist. Other simulation tools can be employed, in place of or in addition to the SPICE simulation, in other embodiments.

In operation 23, an automated placement tool may create a transistor level design by placing cells from a cell library to form the various logic and functional blocks according to the schematic of the IC. In some embodiments, the system 100 performs placement of the IC. In some embodiments, operation 23 includes determining the placement for the electronic components, circuitry, and logic elements. For example, the placement of the transistors, resistors, inductors, logic gates, and other elements of the IC can be selected in operation 23.

In operation 24, an automatic routing tool then determines the connections needed between the devices in the cells, such as MOS transistors. Multiple transistors are coupled together to form functional blocks, such as adders, multiplexers, registers, and the like, in the routing step. In some embodiments, the routing can include one or more metal layers on the cells, so as to connect the cells to power rails and other cells. Routing includes the placement of signal net wires on a metal layer within placed cells to carry non-power signals between different functional blocks. In some embodiments, signal net wires are routed on the same metal level as one of the vertically adjacent metal layers in the multilevel power rails.

Once the routing is determined, automated layout tools are used to map the cells and the interconnections from the router onto a semiconductor device using the process rules and the design rules, as provided. All of these software tools are available commercially for purchase. Cell libraries that are parameterized for certain semiconductor wafer manufacturing facilities are also available.

In operation 25, a post-layout simulation verification can be performed. In some embodiments, the operation 25 may verify the performance of the layout of the IC generated according to the operations 23 and 24. Differing from the pre-layout simulation in operation 22, the post-layout simulation verification considers location, distance and other physical characteristics of elements in the layout of the IC. In some embodiments, the post-layout simulation verification in the operation 25 can extract a netlist from the IC layout generated in according to the operations 23 and 24, and then evaluate the performance of the IC based on the netlist. For example, the performance of the IC can be determined by inputting different signals to the netlist extracted from the layout thereof. The performance of the IC can be determined by operating frequency, power, power loss, etc. In some embodiments, the performance of the IC determined in operations 22 and 25 may be different since the post-layout simulation can include parasitic resistance, capacitance, etc. The post-simulation of the IC may include a voltage drop (IR drop) due to the parasitic decline, such as parasitic resistance or parasitic capacitance. In some embodiments, the parasitic decline may result from the metal layers for routing. For efficiency, a pre-determined IR drop can be defined before the layout is generated, and the layout generating process can include a condition/limitation regarding the pre-determined IR drop so that repeated modification of the layout for IR drop issues is not necessary.

In operation 26, a tape out data file corresponding to an integrated circuit layout of a semiconductor device may be generated. In some embodiments, the IC layouts can include FinFET devices and/or other planar or more complex structural semiconductor manufacturing processes.

Figure 3:
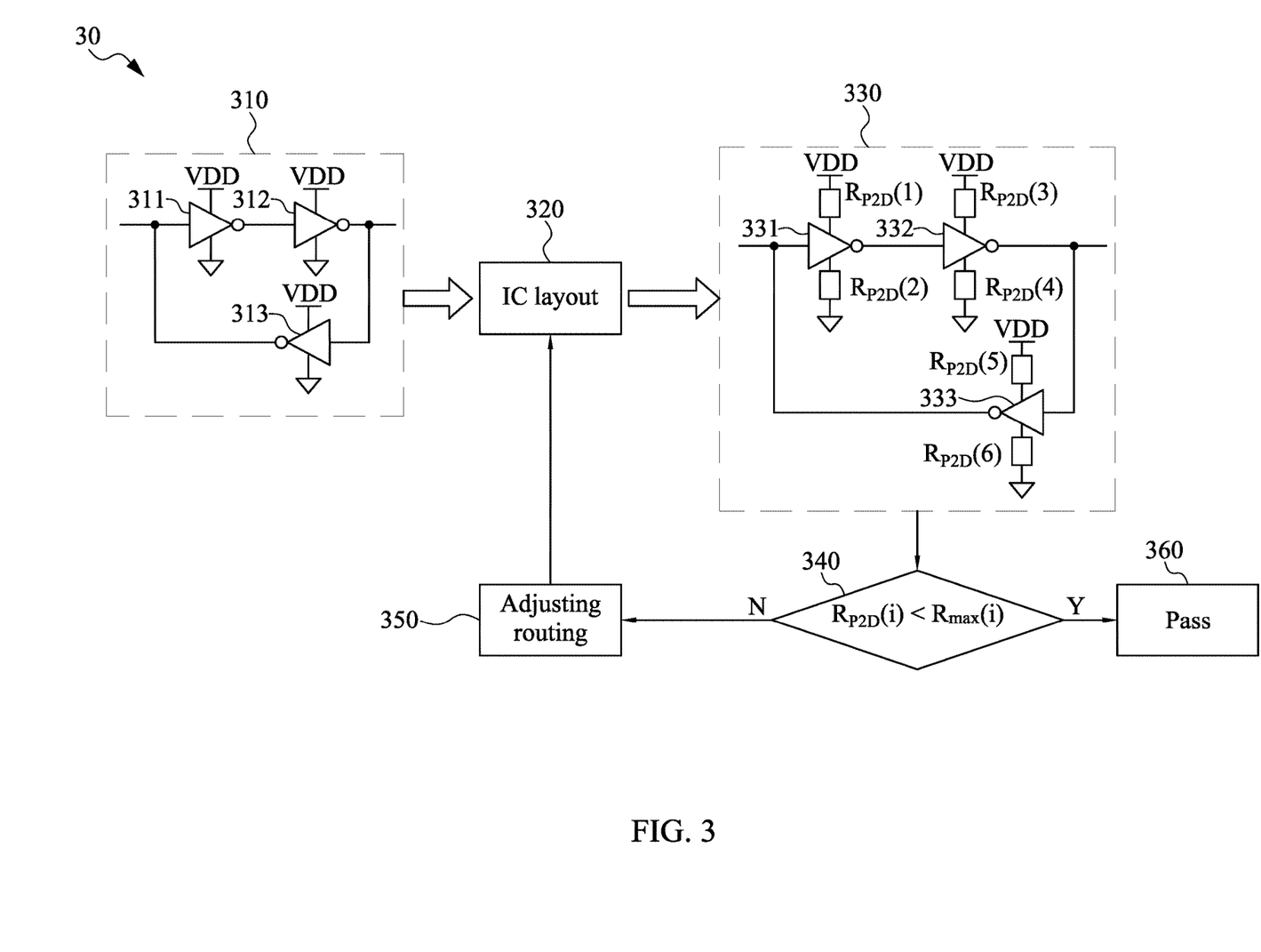
FIG. 3 is a schematic diagram illustrating a method for generating an IC layout, in accordance with some embodiments of the present disclosure.

FIG. 3 is a schematic diagram illustrating a method 30 for generating an IC layout, in accordance with some embodiments of the present disclosure. The method 30 includes operations 310, 320, 330, 340, 350, and 360. The method 30 shows details of the method 20 in FIG. 2.

Referring to FIG. 3, the operation 310 may show an exemplary schematic of the IC before the layout thereof is generated. The operation 310 can correspond to the pre-layout simulation verification in operation 22. In some embodiments, the exemplary schematic of the IC can include three inverters 311, 312, and 313. Each inverter can include an input terminal and an output terminal. In some embodiments, an inverter can have a power terminal configured to receive a power signal (VDD), and a ground terminal connected to ground. In some embodiments, the input terminal of the inverter 311 can be configured to receive test signals. The input terminal of the inverter 312 can be connected to the output terminal of the inverter 311. The output terminal of the inverter 312 can be connected to the input terminal of the inverter 313. The output terminal of the inverter 313 can be connected to the input terminal 311. A test result can be obtained at the output terminal of the inverter 312 in response to the test signal.

In some embodiments, the performance of the exemplary schematic of the IC in the operation 310 can be determined by applying test signal thereon. Accordingly, whether the IC meets the target performance of the IC can be verified. In some embodiments, the pre-determined voltage drop (IR drop) of the IC can be considered when determining whether the IC meets the target performance. In some embodiments, the pre-layout simulation can be determined based on a netlist generated according to the circuit design.

In operation 320, an IC layout is generated according to the schematic of the IC design in operation 310. The operation 320 can include the APR process. For example, the operation 320 may include placement of functional blocks and routing therebetween.

The operation 330 can be a post-layout simulation verification. Operation 330 can correspond to the post-layout simulation verification in operation 25. In some embodiments, the operation 330 may show an exemplary schematic of the IC generated in operation 320. The exemplary schematic in operation 330 can correspond to the exemplary schematic in operation 310, the difference therebetween being that the exemplary schematic in operation 330 further includes parasitic resistance between the power and the function devices (for example, the inverters 331, 332, and 333) and parasitic resistance between the function devices and ground.

In operation 330, the exemplary schematic of the IC can include three inverters: 331, 332, and 333. Considering the layout generated in operation 320, the exemplary schematic of the IC may include parasitic resistances $R_{P2D}(1)$, $R_{P2D}(2)$, $R_{P2D}(3)$, $R_{P2D}(4)$, $R_{P2D}(5)$, and $R_{P2D}(6)$, which are connected between pin/pad (such as power or ground pin/pad) and a device (such as a transistor or inverter). Referring to FIG. 3, the parasitic resistance $R_{P2D}(1)$ can exist between a power pad (not shown) providing the power signal (VDD) and the power terminal of the inverter 331. The parasitic resistance $R_{P2D}(2)$ can exist between a ground pad (not shown) and the ground terminal of the inverter 331. In some embodiments, the parasitic resistance $R_{P2D}(3)$ can exist between the power pad (not shown) providing the power signal (VDD) and the power terminal of the inverter 332. The parasitic resistance $R_{P2D}(4)$ can exist between the ground pad (not shown) and the ground terminal of the inverter 332. In some embodiments, the parasitic resistance $R_{P2D}(5)$ can exist between the power pad (not shown) providing the power signal (VDD) and the power terminal of the inverter 333. The parasitic resistance $R_{P2D}(6)$ can exist between the ground pad (not shown) and the ground terminal of the inverter 333.

Considering the parasitic resistances caused by the routing resource, i.e., conductive elements in metal layers, the performance of the IC verified in operation 330 can be different from the performance verified in operation 310. In some embodiments, the operation 330 may include a netlist extracted from the IC layout generated in operation 320. For example, in operation 330, the performance of the IC can be verified by inputting different signals to the netlist extracted from the layout thereof. In some embodiments, the performance difference between the pre-layout simulation verification and the post-layout verification can be reduced by generating the layout based on the pre-determined IR drop.

In operation 340, the parasitic resistance $R_{P2D}(i)$ between the power/ground pad and the device (for example, the inverter) can be compared with a threshold $R_{max}(i)$. The threshold (or the maximum parasitic resistance) $R_{max}(i)$ between the power/ground pad and the device can be determined based on the pre-determined IR drop.

If the parasitic resistance $R_{P2D}(i)$ obtained from the layout is greater than the threshold $R_{max}(i)$, the layout of the IC will be determined unacceptable, and the process will proceed to operation 350 for adjusting routing of the layout to reduce the parasitic resistance. On the contrary, if the parasitic resistance $R_{P2D}(i)$ is less than the threshold $R_{max}(i)$, the layout of the IC will be determined acceptable, and the process will proceed to operation 360.

In some embodiments, the parasitic resistance $R_{P2D}(1)$ between the power pad and the inverter 331 can be compared with the threshold $R_{max}(i)$. The parasitic resistance $R_{P2D}(2)$ between the ground pad and the inverter 331 can be compared with the threshold $R_{max}(i)$. In some embodiments, the parasitic resistance $R_{P2D}(3)$ between the power pad and the inverter 332 can be compared with the threshold $R_{max}(i)$. The parasitic resistance $R_{P2D}(4)$ between the ground pad and the inverter 332 can be compared with the threshold $R_{max}(i)$. In some embodiments, the parasitic resistance $R_{P2D}(5)$ between the power pad and the inverter 333 can be compared with the threshold $R_{max}(i)$. The parasitic resistance $R_{P2D}(6)$ between the ground pad and the inverter 333 can be compared with the threshold $R_{max}(i)$.

In operation 350, routing of the layout can be adjusted to reduce the parasitic resistance in the layout. For example, the wire length of the metal layers can be reduced. The adjustment of the routing can be a feedback to the IC layout generated in the operation 320. A detailed description of the routing adjustment may be found in FIG. 4A. After the routing is adjusted, the parasitic resistance $R_{P2D}(i)$ can be obtained according to the updated layout, and whether it is less than the threshold $R_{max}(i)$ can be determined. Operations 320, 330, 340 and 350 can be performed iteratively until the parasitic resistance $R_{P2D}(i)$ is less than the threshold $R_{max}(i)$. In some embodiments, after the operation 350, the operation 320 can generate an IC layout based on the previous one and the routing adjustment according to the operation 350. After the IC layout (the routing) is adjusted, the performance of the IC can be determined based on the netlist extracted from the adjusted IC layout in the operation 330.

In operation 360, the IC layout is determined acceptable and completed. Operation 360 can then proceed to the next process, such as generating a tape out file for manufacturing semiconductor devices according to the completed IC layout.

Figure 4:
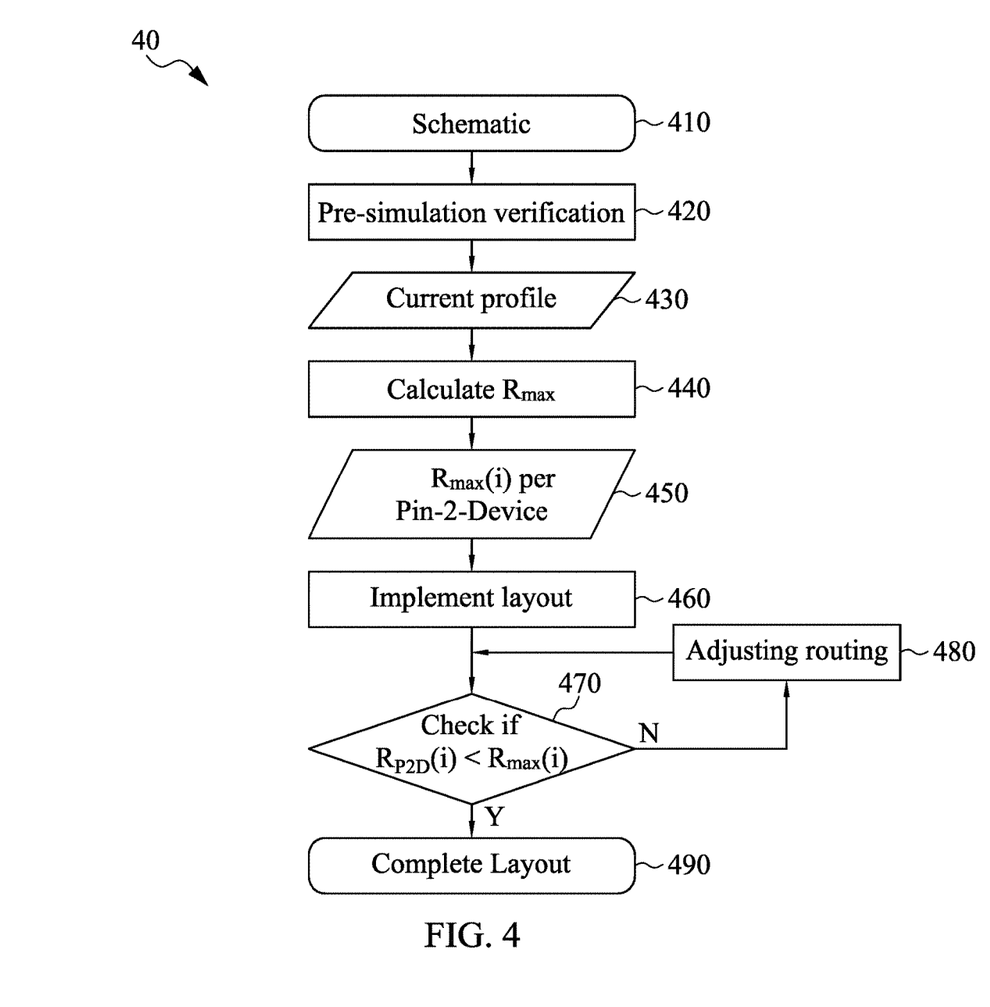
FIG. 4 is a flowchart showing a method for generating an IC layout, in accordance with some embodiments of the present disclosure.

FIG. 4 is a flowchart showing a method 40 for generating an IC layout, in accordance with some embodiments of the present disclosure. The method 40 may be conducted by an EDA tool. The method 40 for generating the IC layout can include a limitation regarding the pre-determined IR drop of the IC to be designed. In some embodiments, the method 40 may take a pre-determined IR drop $V_{margin}$ into consideration, and the routing of the IC layout can be adjusted based on the pre-determined IR drop $V_{margin}$. The method for generating an IC layout shown in FIG. 4 may begin in operation 410, generating a schematic of the IC based on a set of functionality requirements.

In operation 420, a pre-layout simulation verification can be performed. In some embodiments, the operation 420 may verify the performance of the schematic of the IC based on the pre-layout simulation of the IC to be designed. The operation 420 may correspond to the operation 22 in FIG. 2.

In operation 430, the current profile of the IC can be obtained based on the pre-layout simulation. The pre-layout simulation verification in operation 420 can include a limitation regarding the pre-determined IR drop $V_{margin}$. The pre-layout simulation verification in operation 420 can apply different test signals to the IC, and obtain the results thereof, which may include the current profile of the devices in the IC. Based on the current profile passing through each device in the IC, the peak of the current can be determined. A detailed description of operation 430 can be found in FIG. 5A.

In operation 440, a threshold $R_{max}$ between the power/ground pad and the device in the IC can be calculated based on the pre-determined IR drop $V_{margin}$ and the current profile of the devices in the IC. In operation 450, the respective threshold $R_{max}(i)$ between the power/ground pad and the respective device can be calculated via the pre-determined IR drop $V_{margin}$(voltage) and the peak of the current. In some embodiments, each device (for example, the adder, inverter, or the like) can be connected to the power/ground pad, and the respective threshold (or the maximum parasitic resistance) $R_{max}(i)$ between the power/ground pad and the respective device can be calculated.

Figure 5A:
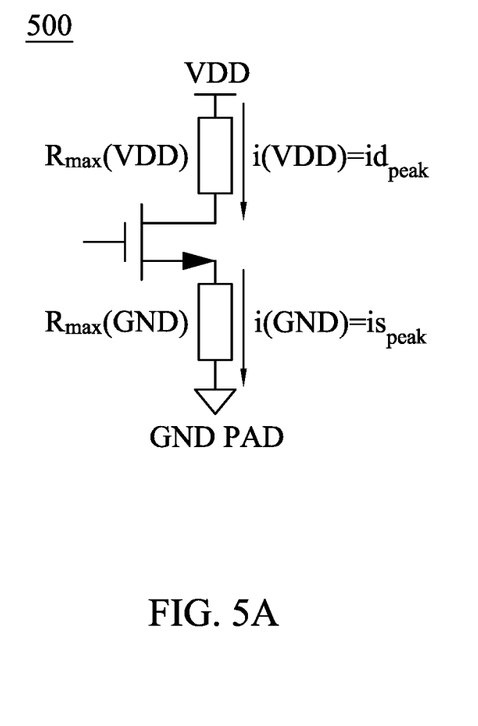
FIG. 5A is a schematic diagram of a circuitry, in accordance with some embodiments of the present disclosure.

FIG. 5A is a schematic diagram of a circuitry 500, in accordance with some embodiments of the present disclosure. Referring to FIG. 5A, the circuitry 500 provides a transistor having a drain connected to a power pad (VDD) to receive a power signal, a source connected to a ground pad (GND PAD), and a gate. In some embodiments, the type of the transistor is not limited. For example, the transistor can be an N-MOS.

The circuitry 500 may have a parasitic resistance between the transistor and VDD and a parasitic resistance between the transistor and GND PAD. In some embodiments, the pre-determined IR drop $V_{margin}$ can be the same between VDD and each device in an IC. Similarly, the pre-determined IR drop $V_{margin}$ can be the same between GND PAD and each device in the IC. The current profile of each device can be extracted based on the pre-layout simulation verification as described in operation 430. Therefore, the peak current of the drain of the transistor $id_{peak}$ and the peak current of the source of the transistor $is_{peak}$ can be obtained.

In some embodiments, the threshold $R_{max}(VDD)$ between the power pad (VDD) and the transistor can be calculated based on a pre-determined IR drop $V_{margin}$ and the current passed from VDD to the drain of the transistor i(VDD), which may take the peak current of the drain of the transistor $id_{peak}$. That is, the threshold $R_{max}(VDD)$ can be expressed as Eq. 1:

$$Rmax(VDD) = \frac{V_{margin}}{id_{peak}}.$$

In some embodiments, the threshold $R_{max}(GND)$ between the ground pad (GND PAD) and the transistor can be calculated based on the pre-determined IR drop $V_{margin}$ and the current passed from the source of the transistor to the ground i(GND), which may take the peak current of the source of the transistor $is_{peak}$. That is, the threshold $R_{max}(GND)$ can be expressed as Eq. 2:

$$Rmax(GND) = \frac{V_{margin}}{is_{peak}}.$$

Referring back to FIG. 4, in operation 460, the EDA tool may implement the layout of the IC. In some embodiments, the layout may include a transistor level design by placing cells from a cell library to form the various logic and functional blocks according to the schematic of the IC. In some embodiments, a plurality of electrical components can be provided in the layout. The layout may also include a routing step so that multiple elements can be coupled together to form functional blocks, such as adders, multiplexers, registers, and the like. In some embodiments, the routing can include one or more metal layers on the cells to connect the devices to power/ground pad and other devices. In some embodiments, one or more metal layers (M0, M1 . . . ) can be disposed on the cells (transistor level), and an interconnection layer can be disposed between adjacent metal layers. In some embodiments, the interconnection layer can include one or more conductive vias (Via0, Via1 . . . ) connecting the adjacent upper and lower metal layers.

In operation 470, a parasitic resistance $R_{P2D}(i)$ between the power/ground pad and the device (for example, a transistor or an inverter) can be obtained and compared with the threshold $R_{max}(i)$ to determine whether the parasitic resistance $R_{P2D}(i)$ is less than the threshold $R_{max}(i)$. The threshold (or the maximum parasitic resistance) $R_{max}(i)$ between the power/ground pad and the device is obtained in operation 450. In some embodiments, the respective parasitic resistance $R_{P2D}(i)$ between the power pad (or the ground pad) and the respective device can be obtained from the layout generated in operation 460.

If the parasitic resistance $R_{P2D}(i)$ obtained from the layout is greater than the threshold $R_{max}(i)$, the layout of the IC will be determined unacceptable, and the process will proceed to operation 480 for adjusting routing of the layout to reduce the parasitic resistance. On the contrary, if the parasitic resistance $R_{P2D}(i)$ is less than the threshold $R_{max}(i)$, the layout of the IC will be determined acceptable, and the process will proceed to operation 490 to complete the layout.

Figure 5B:
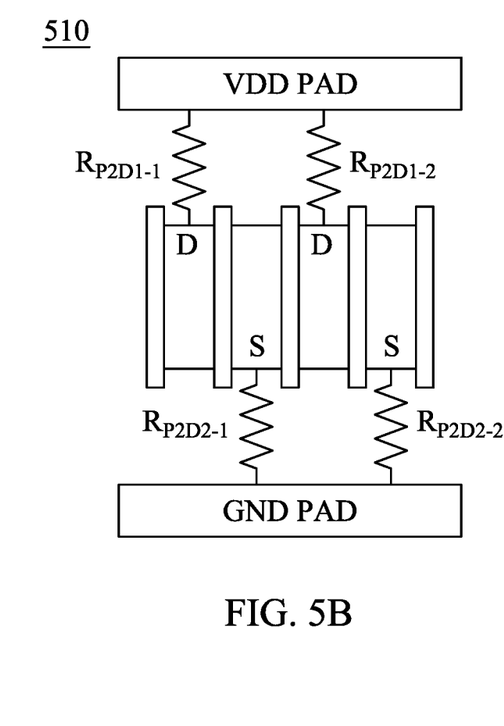
FIG. 5B is a schematic diagram of an IC layout, in accordance with some embodiments of the present disclosure.

FIG. 5B is a schematic diagram of an IC layout 510, in accordance with some embodiments of the present disclosure. The IC layout 510 can correspond to the circuitry 500 in FIG. 5A. The IC layout 510 may have an active area and five gates disposed thereon. In some embodiments, the active area includes two drain regions and two source regions, which are separated by the gates. The IC layout 510 can have a power pad (VDD PAD) and a ground pad (GND PAD).

In some embodiments, the two drain regions in IC layout 510 can be equivalent to the drain in circuitry 500. The two source regions in IC layout 510 can be equivalent to the source in circuitry 500. In one embodiment, the parasitic resistance $R_{P2D1}$ between the power pad and the device (i.e., the transistor) can be formed by the parasitic resistance $R_{P2D1-1}$ between VDD PAD and one drain region of the IC layout 510 and the parasitic resistance $R_{P2D1-2}$ between VDD PAD and another drain region of the IC layout 510. Referring to FIG. 5B, the parasitic resistance $R_{P2D1-1}$ and the parasitic resistance $R_{P2D1-2}$ are electrically connected to VDD PAD in parallel. That is, the parasitic resistance $R_{P2D1}$ between the power pad and the transistor can be expressed as Eq. 3:

$$R_{P2D1} = \frac{1}{\frac{1}{R_{P2D1-1}} + \frac{1}{R_{P2D1-2}}}.$$

According to operation 470, the parasitic resistance $R_{P2D1}$ between the power pad and the transistor can be compared with the threshold $R_{max}$(VDD) to determine whether the parasitic resistance $R_{P2D1}$ is less than the threshold $R_{max}$(VDD).

If the parasitic resistance $R_{P2D1}$ obtained from the layout is greater than the threshold $R_{max}$(VDD), the layout of the IC will be determined unacceptable, and the process will proceed to operation 480 for adjusting routing of the layout to reduce the parasitic resistance. On the contrary, if the parasitic resistance $R_{P2D1}$ is less than the threshold $R_{max}$(VDD), the layout of the IC will be determined acceptable, and the process will proceed to operation 490 to complete the layout.

In another embodiment, the parasitic resistance $R_{P2D2}$ between the ground pad and the device (i.e., the transistor) can be formed by the parasitic resistance $R_{P2D1-1}$ between GND PAD and one source region of the IC layout 510 and the parasitic resistance $R_{P2D2-2}$ between GND PAD and another source region of the IC layout 510. Referring to FIG. 5B, the parasitic resistance $R_{P2D2-1}$ and the parasitic resistance $R_{P2D2-2}$ are electrically connected to GND PAD in parallel. That is, the parasitic resistance $R_{P2D1}$ between the power pad and the transistor can be expressed as Eq. 3:

$$R_{P2D2} = \frac{1}{\frac{1}{R_{P2D2-1}} + \frac{1}{R_{P2D2-2}}}.$$

Similarly, according to operation 470, the parasitic resistance $R_{P2D2}$ between the ground pad and the transistor can be compared with the threshold $R_{max}$(GND) to determine whether the parasitic resistance $R_{P2D2}$ is less than the threshold $R_{max}$(GND).

If the parasitic resistance $R_{P2D2}$ obtained from the layout is greater than the threshold $R_{max}$(GND), the layout of the IC will be determined unacceptable, and the process will proceed to operation 480 for adjusting routing of the layout to reduce the parasitic resistance. On the contrary, if the parasitic resistance $R_{P2D2}$ is less than the threshold $R_{max}$(GND), the layout of the IC will be determined acceptable, and the process will proceed to operation 490 to complete the layout.

Referring back to FIG. 4, in operation 480, routing of the layout can be adjusted to reduce the parasitic resistance in the layout, such that the parasitic resistance can be less than the threshold. For example, the wire length of the metal layers can be reduced. A detailed description of routing adjustment may be found in FIG. 4A. After the routing is adjusted, the parasitic resistance $R_{P2D}(i)$ can be obtained according to the updated layout, and whether it is less than the threshold $R_{max}(i)$ can be determined. Operations 470 and 480 can be performed iteratively until the parasitic resistance $R_{P2D}(i)$ is less than the threshold $R_{max}(i)$.

In this disclosure, since the parasitic resistance of middle-end of line (MEOL) or back-end of line (BEOL) of the IC is controlled to be less than the threshold, the IR drop can therefore be controlled. In other words, the size and the placement of the devices need not be adjusted, which may be modified in current practice. Thus, the area of the IC would not be affected. The performance of the IC can meet the target without adjusting the size and placement of the devices. The proposed method can reduce the performance gap between the pre-layout verification and the post-layout verification, and it requires less time.

In operation 490, the IC layout is determined acceptable. The layout can be completed in operation 490. Operation 490 can include generating a tape out file for manufacturing semiconductor devices according to the completed IC layout.

Figure 4A:
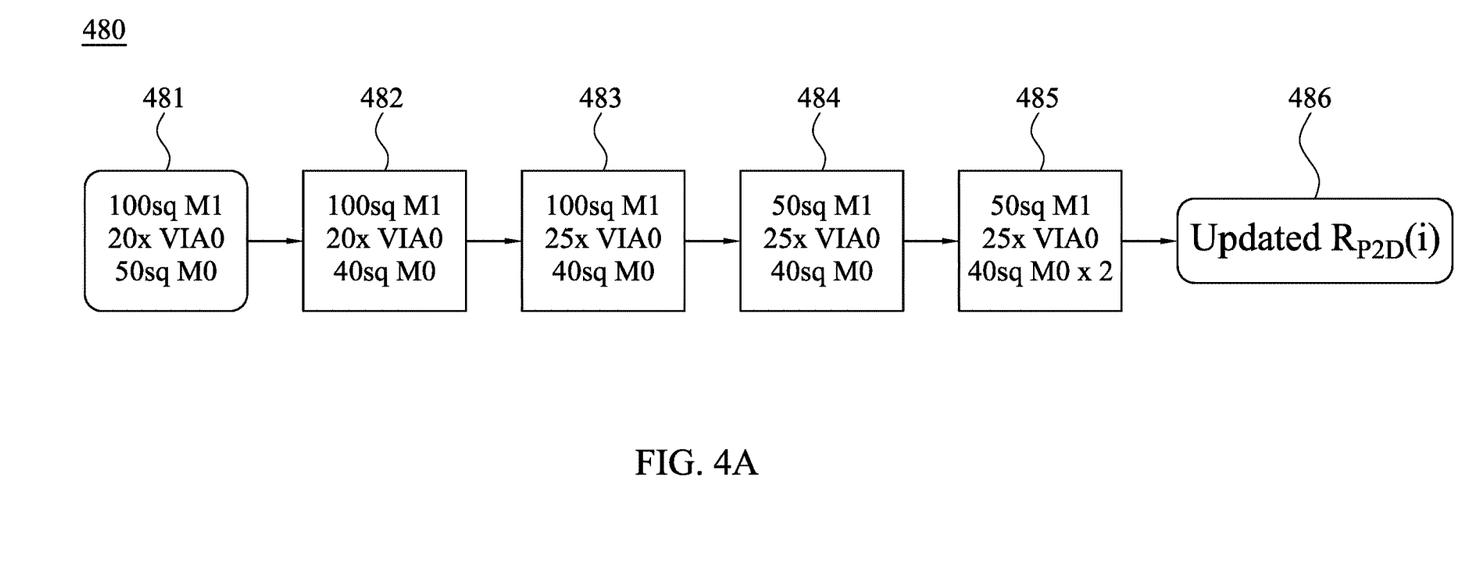
FIG. 4A is a schematic diagram of a method for adjusting routing of an IC layout, in accordance with some embodiments of the present disclosure.

FIG. 4A is a schematic diagram of a method 480 for adjusting routing of an IC layout, in accordance with some embodiments of the present disclosure. The method 480 shows details of the operation 480 in FIG. 4. The method 480 can include steps 481, 482, 483, 484, 485, and 486. In some embodiments, the steps 481, 482, 483, 484, 485, and 486 may show the corresponding status of the BEOL of an IC layout. For example, the IC layout may include two metal layers M0 and M1, and an interconnection layer VIA0. In some embodiments, the metal layers M0 and M1 can include at least one conductive line. The interconnection layer VIA0 can include one or more conductive vias.

In some embodiments, the conductive line in metal layer M0 can extend in a direction. The conductive line in metal layer M1, which is above the metal layer M0, can extend in a direction perpendicular to the direction of the metal layer M0. In some embodiments, the interconnection layer VIA0 can be disposed on the metal layer M0. The interconnection layer VIA0 can be disposed between the metal layers M0 and M1. The components (such as transistor, inverter, power pad, ground pad, and so on) in the IC layout can be connected through the metal layers M0 and M1 and the interconnection layer VIA0. In some embodiments, the routing of the IC layout may include more metal layers and more interconnection layers. The number of metal layers and interconnection layers is not limited.

The method 480 can begin in step 481, showing an initial status of the BEOL of the IC layout. For example, in step 481, the IC layout may include a metal layer M0 having a ratio of wire length to wire width being 50, an interconnection layer VIA0 having 20 conductive vias, and a metal layer M1 having a ratio of wire length to wire width being 100.

The ratio of wire length to wire width can be associated with the resistance thereof. For example, when the ratio increases, the resistance of the metal layer M0 would increase as well. On the contrary, if the ratio decreases, the resistance of the metal layer M0 would decrease. In some embodiments, the resistance of the metal layer M0 can be the parasitic resistance of the IC layout. Similar to the metal layer M0, the metal layer M1 can have a ratio of 100. That is, the metal layer M1 may have a resistance greater than that of the metal layer M0.

In step 482, the resistance of the metal layer M0 can be decreased. For example, the ratio of the metal layer M0 can be adjusted from 50 to 40. In some embodiments, the interconnection layer VIA0 and the metal layer M1 may be the same as those in step 481. To decrease the resistance of the metal layer M0, the conductive line in metal layer M0 can be shortened. In some embodiments, the length of conductive line in the metal layer M0 can be shortened. In another embodiment, the conductive line in metal layer M0 can be widened. That is, the width of conductive line in the metal layer M0 can be extended.

In step 483, the number of the conductive vias in the interconnection layer VIA0 can be increased. For example, the interconnection layer VIA0 can be 25 conductive vias in step 483. More conductive vias disposed in the interconnection layer VIA0 forming the same electrical path may decrease the resistance thereof. In other words, those conductive vias forming the same electrical path are equivalent to electrical connection in parallel. Therefore, the resistance of the IC layout can be decreased.

In step 484, the resistance of the metal layer M1 can be decreased. For example, the ratio of the metal layer M1 can be adjusted from 100 to 50. To decrease the resistance of the metal layer M1, the conductive line in metal layer M1 can be shortened. In some embodiments, the length of the conductive line in the metal layer M1 can be shortened. In another embodiment, the conductive line in metal layer M1 can be widened. That is, the width of the conductive line in the metal layer M1 can be extended.

In step 485, an additional conductive line may be disposed in the metal layer M0. That is, the additional conductive line can be level with the original conductive line in the metal layer M0. In some embodiments, the additional conductive line can be electrically connected with the conductive line in the metal layer M0 in parallel, such that the resistance of the metal layer M0 can be decreased.

In step 486, the parasitic resistance $R_{P2D}(i)$ between the power/ground pad and device can be updated based on the adjusted IC layout.

In method 480, the steps 482, 483, 484, and 485 are optionally performed. For example, the routing adjustment may merely perform one of the steps 482, 483, 484, and 485, and then the updated parasitic resistance $R_{P2D}(i)$ is determined acceptable. In another embodiment, the parasitic resistance $R_{P2D}(i)$ may be acceptable until the steps 482, 483, 484, and 485 are performed. In some embodiments, the steps 482, 483, 484, and 485 are not performed in sequence.

In some embodiments, if the steps 482, 483, 484, and 485 are all performed, and the updated parasitic resistance $R_{P2D}(i)$ is still determined unacceptable, the routing of the IC layout may be rerouted. That is, the whole routing pattern can be changed.

As the operations 470 and 480 in FIG. 4, adjusting routing may need one or more iterations to reach the target performance. The present disclosure provides a method that can slightly adjust the routing to reach the target. In some embodiments, the method 480 in FIG. 4A can be applied to an IC layout having more metal layers and more interconnection layers. The conditions shown in FIG. 4A are for illustration only and are not limited thereto.

Figure 6:
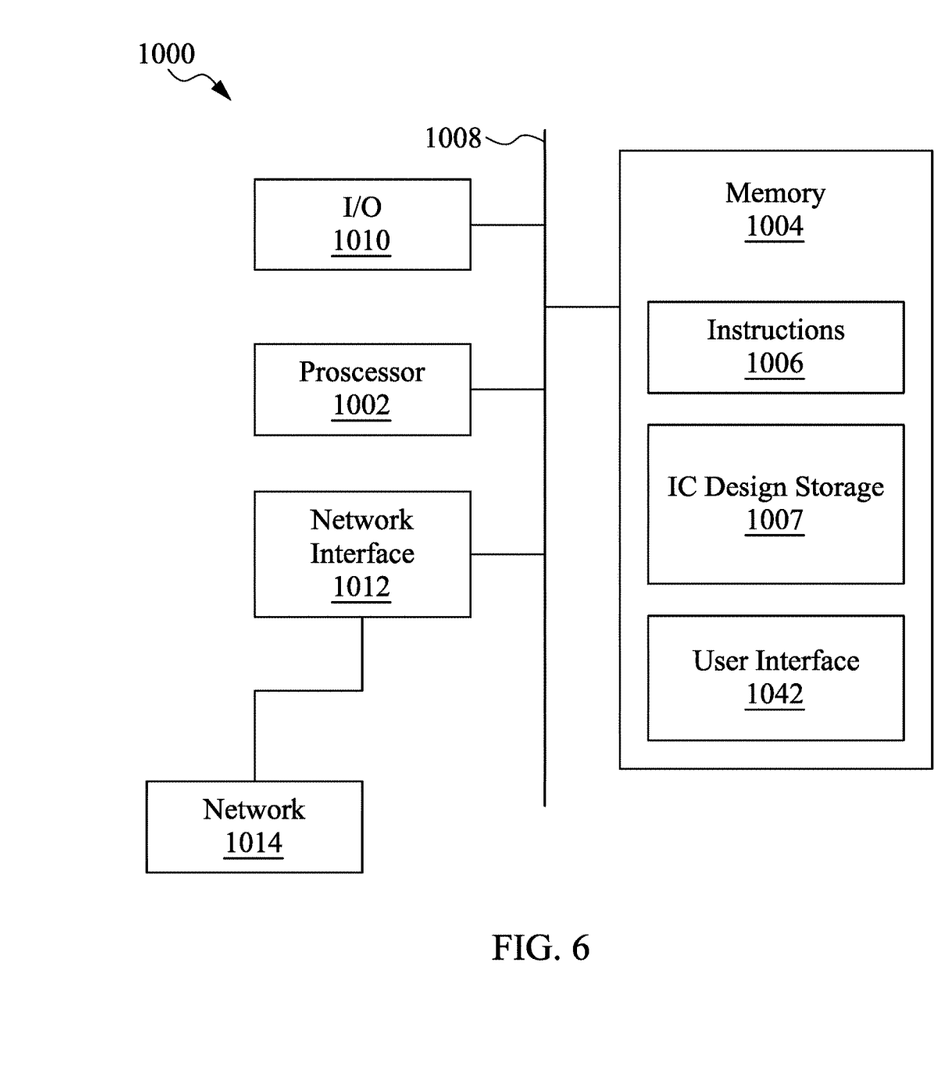
FIG. 6 is a block diagram of an IC layout diagram generation system, in accordance with some embodiments.

FIG. 6 is a block diagram of IC design system 1000, in accordance with some embodiments. Methods described herein of designing IC layout diagrams in accordance with one or more embodiments are implementable, for example, using IC design system 1000, in accordance with some embodiments. In some embodiments, IC design system 1000 can be an APR system, can include an APR system, or can be a part of an APR system, usable for performing an APR method.

In some embodiments, IC design system 1000 includes a processor 1002 and non-transitory, computer-readable memory 1004. Memory 1004, amongst other things, is encoded with, i.e., stores, computer program code, i.e., a set of executable instructions 1006. Execution of instructions 1006 by the processor 1002 represents (at least in part) an EDA tool which implements a portion or all of a method, e.g., a method of generating an IC layout diagram described above (hereinafter, the noted processes and/or methods).

Processor 1002 is electrically coupled to computer-readable memory 1004 via a bus 1008. Processor 1002 is also electrically coupled to an I/O interface 1010 by bus 1008. Network interface 1012 is also electrically connected to processor 1002 via bus 1008. Network interface 1012 is connected to a network 1014, so that processor 1002 and computer-readable memory 1004 are capable of connecting to external elements via network 1014. Processor 1002 is configured to execute instructions 1006 encoded in computer-readable memory 1004 in order to cause IC design system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, memory 1004 is an electronic, magnetic, optical, electromagnetic, infrared, and/or a semiconductor system (or apparatus or device). For example, memory 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, memory 1004 includes a compact disk-read only memory (CD-ROM), a compact disk-read/write (CD-R/W), and/or a digital video disc (DVD).

In one or more embodiments, memory 1004 stores instructions 1006 configured to cause IC design system 1000 (where such execution represents (at least in part) the EDA tool) to be usable for performing a portion or all of the noted processes and/or methods. In one or more embodiments, memory 1004 also stores information which facilitates performing a portion or all of the noted processes and/or methods. In one or more embodiments, memory 1004 includes IC design storage 1007 configured to store one or more IC layout diagrams.

IC design system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

IC design system 1000 also includes network interface 1012 coupled to processor 1002. Network interface 1012 allows IC design system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1000.

IC design system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. IC design system 1000 is configured to receive information related to a UI through I/O interface 1010. The information is stored in memory 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
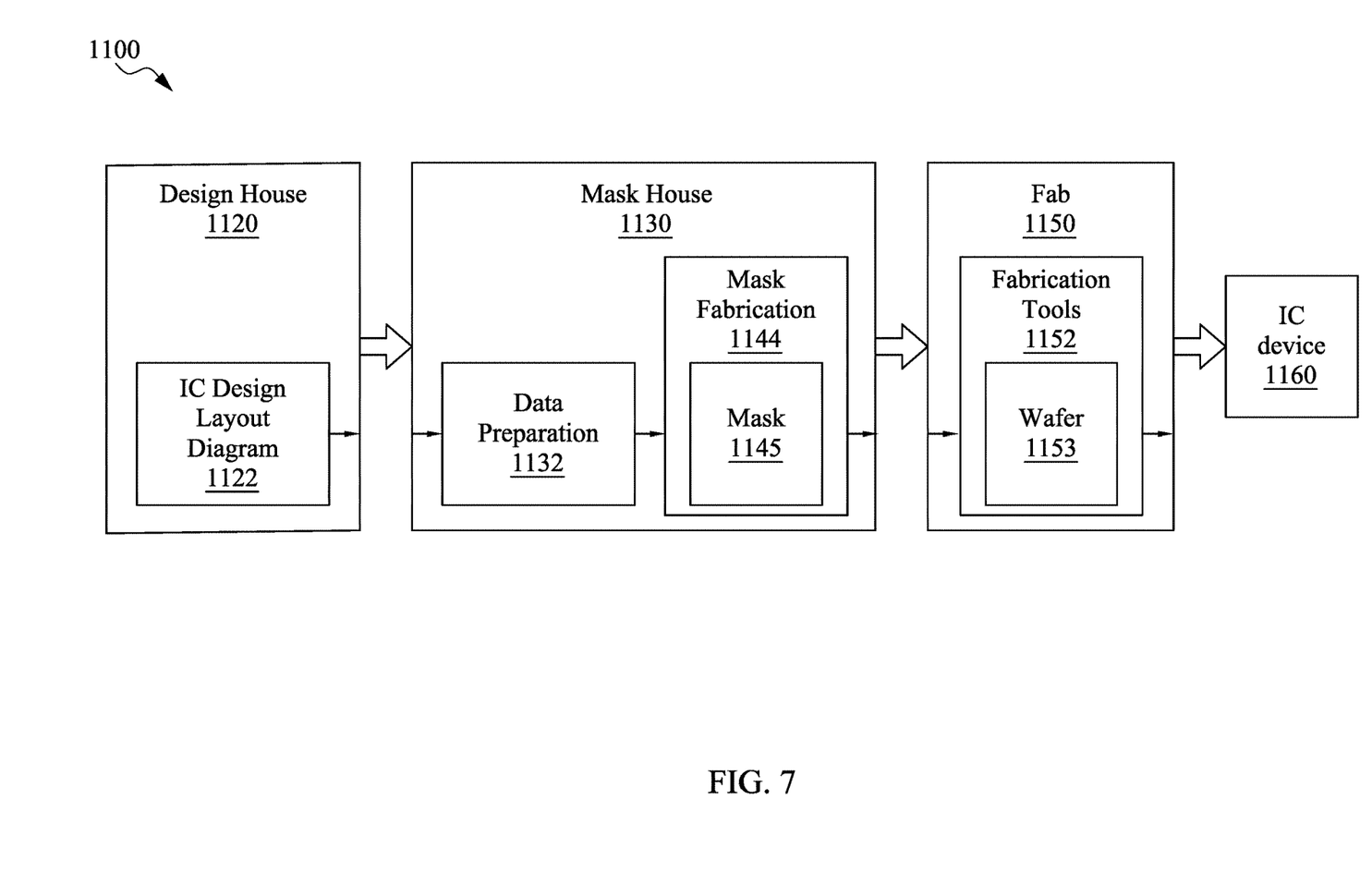
FIG. 7 is a block diagram of an IC manufacturing system, and an IC manufacturing flow associated therewith, in accordance with some embodiments.

FIG. 7 is a block diagram of IC manufacturing system 1100, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC layout diagram 1122. IC layout diagram 1122 includes various geometrical patterns, e.g., an IC layout diagram discussed above. The geometrical patterns correspond to patterns of metal, oxide, or semiconductor layers that make up the various components of IC device 1160 to be fabricated. The various layers combine to form various IC features. For example, a portion of IC layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC layout diagram 1122. The design procedure includes one or more of logic design, physical design or place and route. IC layout diagram 1122 is presented in one or more data files having information of the geometrical patterns. For example, IC layout diagram 1122 can be expressed in a GDSII file format or DFII file format.

Mask house 1130 includes data preparation 1132 and mask fabrication 1144. Mask house 1130 uses IC layout diagram 1122 to manufacture one or more masks 1145 to be used for fabricating the various layers of IC device 1160 according to IC layout diagram 1122. Mask house 1130 performs mask data preparation 1132, where IC layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC layout diagram 1122.

It should be understood that the description of mask data preparation 1132 has been simplified for the purposes of clarity. In some embodiments, data preparation 1132 includes additional features such as a logic operation (LOP) to modify the IC layout diagram 1122 according to manufacturing rules. Additionally, the processes applied to IC layout diagram 1122 during data preparation 1132 may be executed in a variety of different orders.

After mask data preparation 1132 and during mask fabrication 1144, a mask 1145 or a group of masks 1145 are fabricated based on the modified IC layout diagram 1122. In some embodiments, mask fabrication 1144 includes performing one or more lithographic exposures based on IC layout diagram 1122. In some embodiments, an electron-beam (e-beam) or a mechanism of multiple e-beams is used to form a pattern on a mask (photomask or reticle) 1145 based on the modified IC layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front-end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes wafer fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC layout diagram 1122. Semiconductor wafer 1153 includes a silicon substrate or other proper substrate having material layers formed thereon. Semiconductor wafer 1153 further includes one or more of various doped regions, dielectric features, multilevel interconnects, and the like (formed at subsequent manufacturing steps).

According to some embodiments, a method for arranging components within a semiconductor device is provided. The method includes providing a plurality of electrical components in a pre-layout, generating a first layout by routing the plurality of electrical components, obtaining a first resistance between a power terminal of the first layout and a first terminal of a first electrical component in the first layout, comparing the first resistance and a first threshold, adjusting routing of the first layout such that the first resistance is less than the first threshold, and generating a tape out file for the semiconductor device according to the first layout.

According to another embodiment, a method for arranging components within a semiconductor device is provided. The method includes providing a first electrical component in a first layout, the first electrical component having a first contact, disposing a first conductive segment on the first electrical component, the first conductive segment electrically connected to the first contact of the first electrical component, disposing a first conductive via on the first conductive segment, disposing a second conductive segment on the first conductive via. The second conductive segment is configured to receive power, and the first conductive via connects between the first conductive segment and the second conductive segment. The method further includes obtaining a first resistance between the second conductive segment and the first contact of the first electrical component, comparing the first resistance and a first threshold, adjusting routing of the first layout such that the first resistance is less than the first threshold, and generating a tape out file for the semiconductor device according to the first layout.

According to other embodiments, a non-transitory computer-readable medium is provided. The non-transitory computer-readable medium stores computer-executable instructions. When the computer-executable instructions are executed on a computer system, the computer system is caused to: provide a plurality of electrical components in a pre-layout; generate a first layout by routing the plurality of electrical components; obtaining a first resistance between a power terminal of the first layout and a first terminal of a first electrical component in the first layout; compare the first resistance and a first threshold; adjust routing of the first layout until the first resistance less than the first threshold; and generating a tape out file for a semiconductor device according to the first layout.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method for arranging components of a semiconductor device, comprising steps:
   (a) providing a plurality of electrical components in a pre-layout;
   (b) generating a first layout by routing the plurality of electrical components;
   (c) obtaining a first resistance between a power terminal of the first layout and a first terminal of a first electrical component in the first layout;
   (d) comparing the first resistance and a first threshold;
   (e) adjusting routing of the first layout;
   (f) performing steps (c), (d) and (e) iteratively until the first resistance less than the first threshold; and
   (g) generating a tape out file for the semiconductor device according to the first layout.

2. The method of claim 1, wherein the routing of the first layout comprises:
   a first conductive segment disposed on the first electrical component and electrically connected to the first terminal;
   a first conductive via disposed on and connected to the first conductive segment; and
   a second conductive segment on the first conductive segment and electrically connected to the power terminal,
   wherein the first conductive via connects between the first conductive segment and the second conductive segment.

3. The method of claim 2, wherein the step (e) comprises decreasing a resistance of the first conductive segment.

4. The method of claim 3, wherein the step (e) comprises:
   shortening a length of the first conductive segment; or
   extending a width of the first conductive segment.

5. The method of claim 2, wherein the step (e) comprises disposing a second conductive via between the first conductive segment and the second conductive segment.

6. The method of claim 5, wherein the second conductive via and the first conductive via are electrically connected in parallel.

7. The method of claim 2, wherein the step (e) comprises decreasing a resistance of the second conductive segment.

8. The method of claim 7, wherein the step (e) comprises:
   shortening a length of the second conductive segment; or
   extending a width of the second conductive segment.

9. The method of claim 2, wherein the step (e) comprises disposing a third conductive segment on the first electrical component, wherein the third conductive segment is level with the first conductive segment.

10. The method of claim 9, wherein the third conductive segment is electrically connected to the first conductive segment in parallel.

11. The method of claim 1, wherein the first threshold is calculated based on a predefined voltage loss between the power terminal and the first terminal of the first electrical component.

12. A method for arranging components of a semiconductor device, comprising steps:
    (a) providing a first electrical component in a first layout, the first electrical component having a first contact;
    (b) disposing a first conductive segment on the first electrical component, the first conductive segment electrically connected to the first contact of the first electrical component;
    (c) disposing a first conductive via on the first conductive segment;
    (d) disposing a second conductive segment on the first conductive via, the second conductive segment configured to receive power, wherein the first conductive via connects between the first conductive segment and the second conductive segment;
    (e) obtaining a first resistance between the second conductive segment and the first contact of the first electrical component;
    (f) comparing the first resistance and a first threshold;
    (g) adjusting the first layout;
    (h) performing steps (e), (f), and (g) iteratively until the first resistance less than the first threshold; and
    (i) generating a tape out file for the semiconductor device according to the first layout.

13. The method of claim 12, wherein the step (g) comprises decreasing a resistance of the first conductive segment.

14. The method of claim 13, wherein the step (g) comprises:
    shortening a length of the first conductive segment in the first metal layer; or
    extending a width of the first conductive segment.

15. The method of claim 12, wherein the step (g) comprises disposing a second conductive via between the first conductive segment and the second conductive segment.

16. The method of claim 15, wherein the second conductive via and the first conductive via are connected in parallel.

17. The method of claim 12, wherein the step (g) comprises decreasing a resistance of the second conductive segment.

18. The method of claim 17, wherein the step (g) comprises
    shortening a length of the second conductive segment; or
    extending a width of the second conductive segment.

19. The method of claim 12, wherein the step (g) comprises disposing a third conductive segment on the first electrical component, wherein the third conductive segment is connected to the first conductive segment in parallel.

20. A non-transitory computer-readable medium storing computer-executable instructions, when the computer-executable instructions are executed on a computer system, the computer system is caused to perform steps:
    (a) providing a plurality of electrical components in a pre-layout;
    (b) generating a first layout by routing the plurality of electrical components;
    (c) obtaining a first resistance between a power terminal of the first layout and a first terminal of a first electrical component in the first layout;
    (d) comparing the first resistance and a first threshold;
    (e) adjusting routing of the first layout;
    (f) performing steps (c), (d) and (e) iteratively until the first resistance less than the first threshold; and
    (g) generating a tape out file for a semiconductor device according to the first layout.

* * * * *